United States Patent
Michler

(10) Patent No.: US 6,389,941 B1
(45) Date of Patent: *May 21, 2002

(54) ROTARY KNIFE WITH ELECTROMAGNETIC ACTIVE VIBRATION CONTROL

(75) Inventor: James R. Michler, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/549,644

(22) Filed: Apr. 14, 2000

(51) Int. Cl.$^7$ .......................... B23Q 15/18; B23Q 17/12
(52) U.S. Cl. .................. 83/74; 83/342; 83/575; 83/698.21; 101/216; 384/448
(58) Field of Search .................. 384/448; 101/216; 702/10.1, 13.4, 237; 83/72, 74, 75, 342, 344, 576, 745, 698.21

(56) References Cited

U.S. PATENT DOCUMENTS

| | | | |
|---|---|---|---|
| 1,318,892 A | 10/1919 | Maier | 83/296 |
| 2,001,167 A | 5/1935 | Swennes | 64/29 |
| 2,736,393 A | 2/1956 | O'Connor | 188/1 |
| 2,942,534 A | 6/1960 | Boddy | 93/58.2 |
| 3,075,406 A | 1/1963 | Butler, Jr. et al. | 74/574 |
| 3,380,328 A | 4/1968 | Martin | 83/156 |
| 3,570,348 A | 3/1971 | Hallden | 83/342 |
| 3,845,827 A | 11/1974 | Schulin | 173/162 |
| 4,125,073 A * | 11/1978 | Bain | 101/216 |
| 4,290,353 A * | 9/1981 | Pav et al. | 101/216 X |
| 4,364,296 A | 12/1982 | Hirsch | 83/674 |
| 4,372,205 A * | 2/1983 | Pflaum | 101/216 X |
| 4,487,123 A * | 12/1984 | Kobler et al. | 101/216 |
| 4,548,112 A | 10/1985 | Thomas | 83/345 |
| 4,756,219 A | 7/1988 | Pohl et al. | 83/344 |
| 4,809,573 A * | 3/1989 | Welch | 83/72 X |
| 5,022,201 A | 6/1991 | Kobori et al. | 52/167 |
| 5,048,387 A * | 9/1991 | Niitsuma et al. | 83/344 |
| 5,421,129 A | 6/1995 | Sakamoto et al. | 52/167.1 |
| 5,447,001 A | 9/1995 | Nishimura et al. | 52/167.2 |
| 5,596,931 A | 1/1997 | Reössler et al. | 101/484 |
| 5,700,116 A | 12/1997 | Cobb, Jr. | 409/141 |
| 5,720,210 A * | 2/1998 | Okahashi | 83/698.21 X |
| 5,724,846 A * | 3/1998 | Wang et al. | 72/13.4 X |
| 5,752,404 A * | 5/1998 | White et al. | 72/237 X |
| 5,983,168 A | 11/1999 | Michler | 702/194 |
| 6,032,558 A | 3/2000 | Michler | 83/74 |

FOREIGN PATENT DOCUMENTS

RU  555010  12/1975

OTHER PUBLICATIONS

"The Direct Drive Cutoff Knife", Marquip brochure, D.D.C.O.–4 May 25, 1984, Marquip Inc., 1984.

* cited by examiner

Primary Examiner—Charles Goodman
(74) Attorney, Agent, or Firm—Andrus, Sceales, Starke & Sawall

(57) ABSTRACT

A rotary knife incorporates the use of an electronically controlled, active damping system to control vibrations of knife cylinders. The system preferably uses pairs of electromagnetic actuators to provide opposing pulling forces on a ferromagnetic portion of a lever arm that is mechanically coupled to the stationary support shaft for the knife cylinder. Vibration sensors, preferably accelerometers, are used to monitor vibrations of the respective knife cylinders. A digital signal processor implementing a state space control system controls the electromagnetic actuators to actively cancel vibration energy in the knife cylinders.

18 Claims, 8 Drawing Sheets

ROTARY KNIFE WITH ELECTROMAGNETIC ACTIVE VIBRATION CONTROL

FIELD OF THE INVENTION

The invention relates to controlling vibration of rotary knife cylinders that are used to cut individual sheets in succession from a longitudinally traveling continuous web of material, such as corrugated paperboard. In particular, the invention involves the use of electronically controlled electromagnets to actively damp vibrations, particularly at the natural resonance frequency of the respective rotary knife cylinders.

BACKGROUND OF THE INVENTION

The invention arose during continuing developmental efforts by the assignee of the present application in seeking improved vibration control for rotary machinery, namely rotary knives as disclosed in copending patent application Ser. No. 09/045,466, now U.S. Pat. No. 6,032,558, entitled "A Rotary Knife With Active Vibration Control", by James R. Michler, incorporated by reference herein.

In the corrugated paperboard industry, long machines comprised of several components are used to make individual pieces of corrugated paperboard from rolls of craft paper and adhesive. In these machines, a rotary knife is used to cut a continuous web of corrugated paperboard into individual sheets towards the end of the manufacturing process. These individual sheets of corrugated paperboard are then normally stacked and transported for finishing. The quality of the individual sheets and in turn the quality of the end product made from the corrugated sheets depends in large part on the performance of the rotary knife.

In a typical rotary knife, a pair of rotating knife cylinders extend generally transverse across the web. The outer cylindrical wall of each cylinder includes a cutting blade that is helically mounted to the respective cylinder. Gears for the cylinders ensure that the cylinders rotate symmetrically so that the blades engage the web and each other to cut the web transversely in a scissors-like fashion. In order to provide a high quality cut, it is important that the blades tightly engage one another when making the scissors cut. A control system for the knife precisely controls the speed of the rotating cylinders so that the forward velocity of the blade during the cut matches the forward velocity of the web through the knife. In addition, the desired length of the individual sheets for the particular order is regulated by controlling the speed of the rotating cylinders when the blades are not engaged, which is in general a different speed than when the blades are engaged to make the cut. This type of variable speed operation is conventional in the art.

Due to the above-described variable speed operation, low inertia rotary knives are used by the assignee of the present application primarily to improve motor drive control and durability at high speeds. In these low inertia rotary knife cylinders, an upper stationary support shaft and a lower stationary support shaft are mounted to a frame (normally using retainer mounts). An upper rotatable cylindrical tube is placed concentrically over the upper stationary support shaft and a lower rotatable cylindrical tube is placed concentrically over the lower stationary support shaft. The knife blades are attached to the outer wall of the rotatable cylindrical tubes. Bearings are located between the rotatable cylindrical tubes and the respective stationary support shaft. The rotational inertia of the tubular knife cylinder is significantly less than in systems having solid rotating knife cylinders.

In low inertia rotary knife systems, as well as other rotary knife systems, excessive vibration of the knife cylinders can cause poor quality cuts. Under extreme conditions, the vibrations can sometimes even prevent cuts from occurring altogether. It has been found that cutting frequency has a substantial effect on the amount of steady state vibration, and hence the quality of the cut. When the cutting frequency (number of cuts per second) is an integral, or near integral, multiple of the knife cylinder first natural frequency (number of cycles per second), each successive cut adds to the vibration remaining from the previous cut. The total knife cylinder vibration then builds up to a higher level than at slightly different cutting frequencies. A speed change of less than 1% can change the cylinder vibration level by more than 50%. This being the case, vibration problems are more apparent when the knife is operating at high speeds because there is less time for natural dampening to occur between cutting cycles. In addition, vibration problems are more apparent on webs that require relatively high cutting forces.

In the above-incorporated copending patent application Ser. No. 09/045,466, now U.S. Pat. No. 6,032,558, the assignee of this application discloses an active tuned-mass vibration damping system in order to control vibrations of the knife cylinders. More specifically, that system includes a tuned-mass, and a spring arm having one end coupled to the tuned-mass and the other end coupled to the end of the knife cylinder (e.g. in a low inertia rotary knife, the spring arm is coupled to the end of the stationary support shaft). Actuators, preferably electromagnetic actuators, are mounted to provide force on the tuned-mass in order to actively dampen vibrations of the knife cylinder. Vibrations of the knife cylinder and the tuned-mass are measured using vibration sensors, preferably accelerometers, which transmit signals to an electronic control unit. The electronic control unit calculates command signals, preferably using state space control, to drive the electromagnetic actuators in order to actively dampen vibrations in the associated knife cylinder. It is preferred that the control scheme account for phase shifts in the system due to electronic lags (for example, phase lags in the electromagnetic actuator, processing electronics, etc.) by using adjusted control coefficients in the state space control algorithm. The preferred control scheme is disclosed in copending patent application Ser. No. 09/046,267 filed on Mar. 23, 1998, now U.S. Pat. No. 5,983,168, entitled "Phase Shift Accommodation for Active Tuned-mass Damping System", by James R. Michler, assigned to the assignee of the present application, and incorporated herein by references. The command signal is scaled and then output from the electronic control unit to drive the electromagnetic actuators which provide force on the tuned-mass to actively damp vibrations in the knife cylinder.

It is also disclosed in the above-incorporated copending patent application Ser. No. 09/045,466, now U.S. Pat. No. 6,032,558, entitled "A Rotary Knife With Active Vibration Control", by James R. Michler, that the tuned-mass be preferably made from a plurality of laminated steel plates. The steel plates are aligned in the direction of the magnetic field from the respective electromagnetic actuators. In this manner, any currents transverse to the direction of the magnetic field are not allowed to propagate for substantial distances, and thus are prevented from generating excessive heat in the tuned-mass. In addition, it was preferred to have permanent magnets embedded in the surface of the tuned-mass at locations corresponding to the legs of the respective electromagnetic actuators. In this manner, a single electromagnetic actuator could be used to both push and pull the tuned-mass in the selected direction. The permanent magnets were affixed to the tuned-mass using adhesive.

While the inventions disclosed in the above incorporated copending patent application Ser. No. 09/045,466, now U.S. Pat. No. 6,032,558, and copending patent application Ser. No. 09/046,267 (now U.S. Pat. No. 5,983,168) are effective at reducing rotary knife vibrations, some difficulties have arisen with respect to commercial embodiments of the inventions in certain applications. For example, the commercial systems included eight sensors (i.e., vertical and horizontal accelerometers for both the knife shaft and tuned-mass for both the upper and lower knife cylinders), and occasionally one of the sensors would fail. Upon sensor failure, it was possible for the control system to become unstable and actually increase the total vibration level. If left unchecked, the increased vibration level could damage knife blades. Eliminating the potential for such instabilities is desirable.

In addition to reducing instabilities due to sensor failure, it has also been found that it would be desirable to improve the response time for the system. Time lags in the system using the spring arm and tuned-mass are generally in the range of 90 to 130 milliseconds, whereas the current commercial version of the rotary knife sold by the assignee of this application is capable of making nine cuts per second (i.e. 111 milliseconds per cut). Thus, process lags in the active vibration control system can significantly compromise system performance.

The tuned mass vibration control system has three sources of lags. The first source of lag is a mechanical transmission lag between the knife cylinder and the tuned mass. For example, a change in vibration amplitude and/or phase at the knife cylinder, as caused by making a cut, can take more than 100 milliseconds to propagate through the knife frame to the tuned mass. The vibration control system reduces vibration only after the tuned mass is able to change its vibration amplitude and phase to match the new vibration amplitude and phase of the knife cylinder. The second source of lag is in the observer. The observer takes about 10 milliseconds to respond to a change in vibration amplitude or phase. The third source of lag is the electronic lag through the control system. The control system will typically have about 2 milliseconds of total lag. This lag comes from the accelerometers, from sampling delays, various analog to digital converters, digital filters, and digital to analog converters in the control system, and from the amplifier that is connected to the electromagnets.

In order to improve system performance, it is desirable to reduce the process lags in the active vibration control system, and especially the most significant type of lag which corresponds to the transmission of mechanical energy.

SUMMARY OF THE INVENTION

The invention is an active vibration control system for a rotary knife that eliminates the use of the spring arm, the tuned-mass, and the sensors associated with the tuned-mass. The spring arm and the tuned-mass are replaced with a lever arm. The lever arm has one end coupled to the knife cylinder, and a distal end that is suspended freely. Actuators are provided to provide a vibration control force directly on the lever arm in response to command signals from the electronic control unit. The lever arm is sufficiently rigid, preferably a steel rod having at least a two inch diameter (typically three inch to four inch diameter), so that mechanical energy is transmitted essentially immediately from the lever arm to the knife cylinder.

Inasmuch as the lever arm and the knife cylinder are coupled to essentially act as a unitary mechanical component, system response lag is reduced significantly. For example, testing has shown that total system response lag for a vibration caused by a cut on a commercial version of assignee's rotary knife has decreased from 90 to 130 milliseconds with the tuned-mass and spring arm to approximately 10 milliseconds with the rigid lever arm.

In the preferred system, the distal end of the lever arm is made of a ferromagnetic material, and the actuators are electromagnetic actuators. It is possible, however, to implement the invention with other types of actuators. For example, mechanical, pneumatic, piezoelectric, magnetostrictive or hydraulic actuators which provide vibration control forces directly against the lever arm should be possible at the frequencies necessary to control vibrations in a rotary knife.

In addition, the sensors for the tuned-mass are eliminated, which renders the system more robust (less sensitive) to sensor failure. The preferred active vibration damping system now has four sensors per rotary knife, two for both the upper and the lower knife cylinder with one each in the vertical and horizontal directions (in each axle). If any sensor fails, the total system effectiveness merely drops by about 25%. If all sensors fail, the system becomes totally ineffective, and the knife cylinders respond as if the active vibration damping system had not been installed.

As mentioned, the lever arm is made from a sufficiently rigid material such as steel. Even in the preferred electromagnetic system, no permanent magnets are embedded in the lever arm. Rather, the system is provided with pairs of opposing electromagnetic actuators. Each actuator of the pair provides a pulling force on a ferromagnetic portion of the lever arm in a direction opposed to the other electromagnetic actuator in the pair. Preferably, one pair of electromagnetic actuators is oriented vertically with respect to the lever arm, and another pair is oriented horizontally with respect to the lever arm. The electromagnetic actuators pull on the freely suspended end of the lever arm. It is preferred that the freely suspended end of the lever arm consist of a plurality of laminated steel plates aligned in the direction of the magnetic field from the respective electromagnetic actuators, in order to reduce transverse eddy currents and prevent the generation of excessive heat in the lever arm.

In the prior system using the spring arm and the tuned-mass, approximately 80% of the energy transmitted to the knife cylinder to actively cancel vibrations was provided by the inertia of the tuned-mass, whereas the remaining energy was provided by the force of the electromagnetic actuators. In the present system, which eliminates the spring arm and the tuned-mass, there is virtually no inertial component in the energy transmitted to the knife cylinder for active control. Nevertheless, the freely suspended end of the lever arm moves substantially less than the tuned-mass in the previous system, and this coupled with the removal of the permanent magnets, allows for significantly greater magnetic forces on the lever arm than were possible with the tuned-mass. Therefore, the present system using the lever arm is actually able to provide about the same amount of energy for reducing vibration, but with a much faster response time.

Other advantages and features of the invention should be apparent to those skilled in the art upon inspecting the drawings and the following description thereof.

DETAILED DESCRIPTION OF THE DRAWINGS

Figure 1:
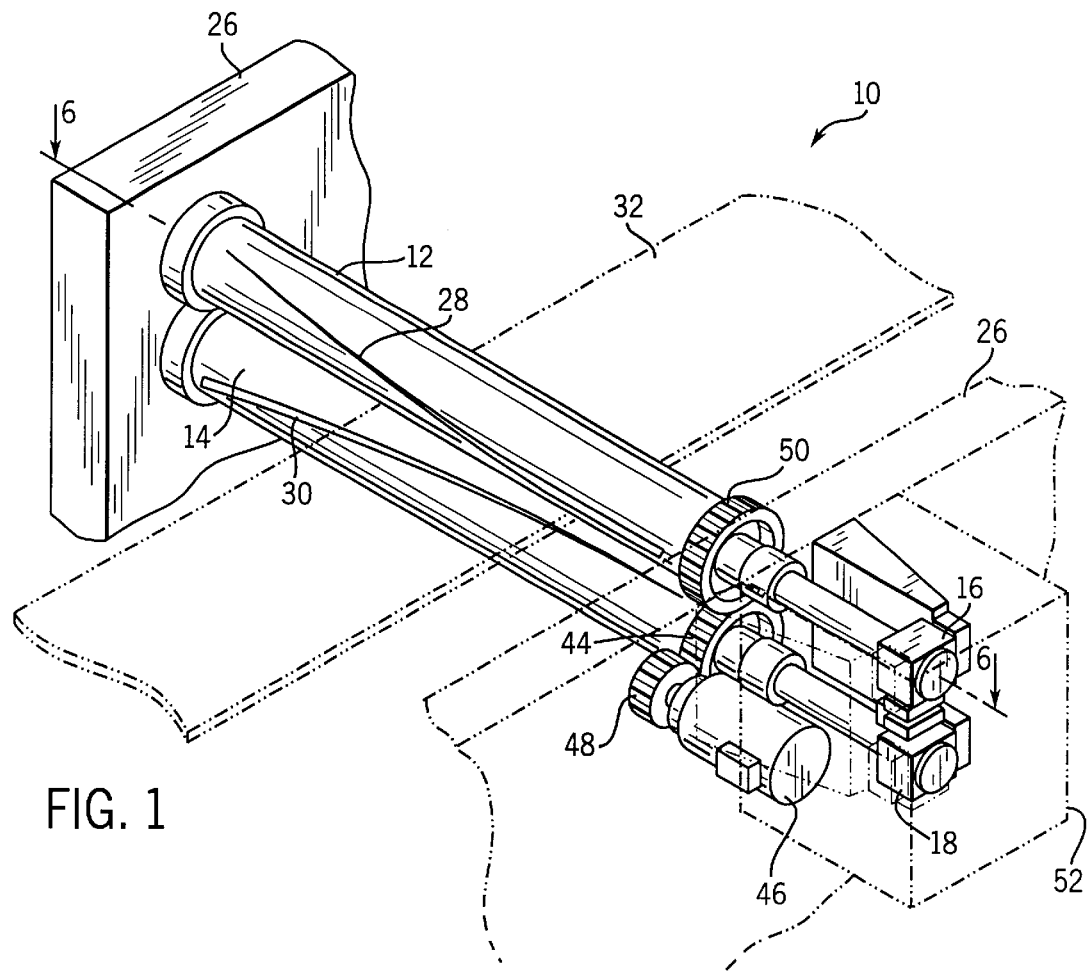
FIG. 1 is a perspective view of a rotary knife used to cut individual sheets in succession from a longitudinally traveling continuous web of material, the rotary knife incorporating an active vibration damping system in accordance with the invention.

FIG. 1 shows a rotary knife 10 having an upper knife cylinder 12 and a lower knife cylinder 14 as well as an active vibration damping system 16 for the upper knife cylinder 12 and an active vibration damping system 18 for the lower knife cylinder 14. The knife cylinders 12, 14 each comprise a stationary support shaft 20, 22 (see FIG. 7) and a tubular knife cylinder 21, 23 mounted to rotate around the respective stationary support shaft 20, 22 via bearings 24, 25. The ends of the stationary support shafts 20, 22 are mounted to the knife frame 26. The details of mounting the knife cylinders 12, 14 to the frame 26 are discussed in detail below. Referring still to FIG. 1, a helical cutting blade 28 is mounted to knife cylinder 12, and a mating helical cutting blade 30 is mounted to knife cylinder 14. The helical blades 28, 30 engage each other as the tubular knife cylinders 21, 23 rotate to cut the continuous web 32 into successive individual sheets.

The lower cylinder 14 is provided with a drive gear 44 at one end of the cylinder 14 near the frame 26. An electrically powered motor 46 powers gear 48 which engages gear 44 on the lower cylinder 14 to rotate the lower cylinder 14. An electronic controller controls the speed of the motor 46 to control the speed of the rotation of the lower gear 44. The upper knife cylinder 12 also includes a drive gear 50 at one of the ends of the upper cylinder 12. In the system shown in the drawings, drive gear 50 on the upper cylinder 12 engages drive gear 44 on the lower cylinder 14 so that the upper knife cylinder 12 and the lower knife cylinder 14 are driven contemporaneously by electric motor 46. While the drawings show one particular drive system for the rotary knife 10, various other drive systems may be used in accordance with the invention. For instance, a cluster of electric drive motors may be used to drive the lower 14 and upper 12 knife cylinders contemporaneously, or a separate electric drive motor may be used to drive the upper knife cylinder 12.

Figure 2:
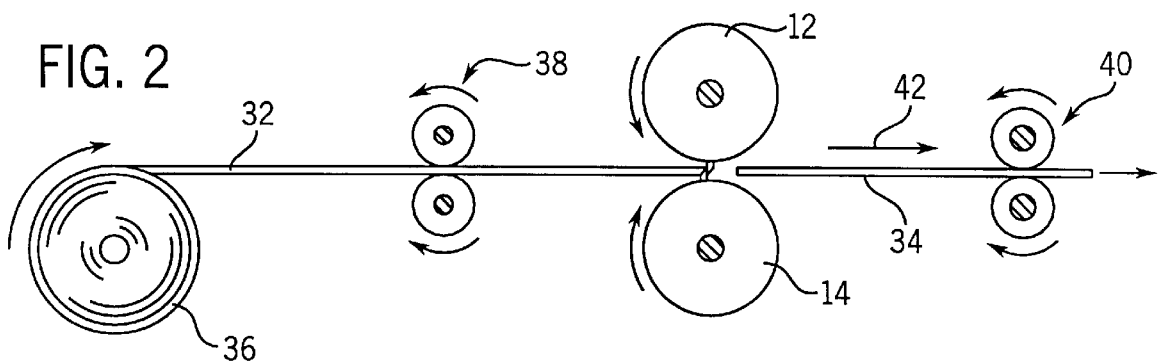
FIG. 2 is a schematic view illustrating the cutting of individual sheets in succession from a traveling continuous web on the rotary knife shown in FIG. 1.
Figure 3:
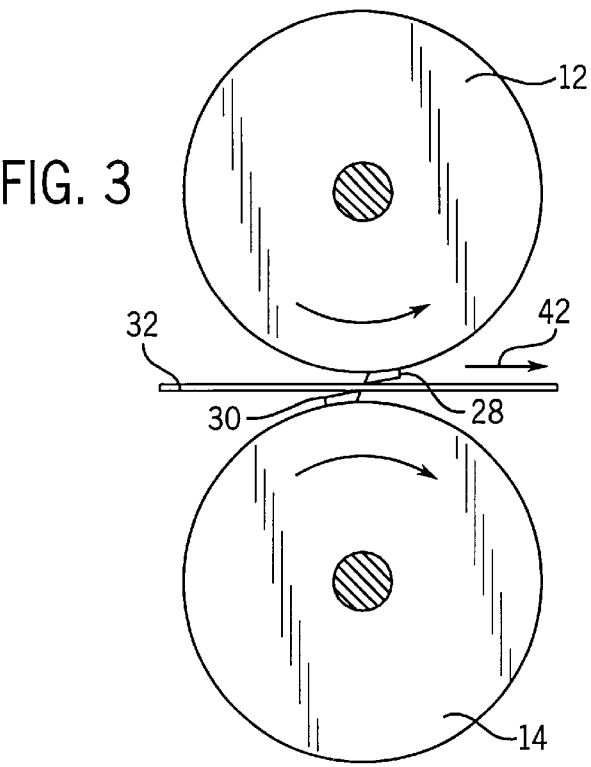
FIG. 3 is an enlarged end view showing the cutting of the web by a pair of knife cylinders.
Figure 4:
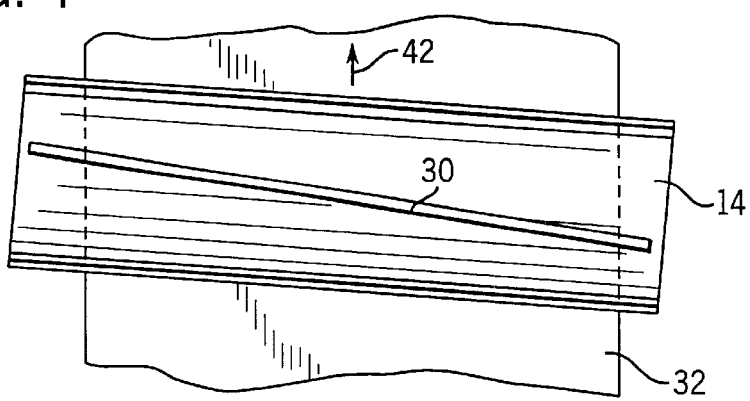
FIG. 4 is a top plan view of the bottom knife cylinder shown in FIG. 3 which illustrates the orientation of the knife cylinder with respect to the continuous web.

FIGS. 2–4 schematically illustrate the general concept of cutting sheets 34 in succession from the web 32. In FIG. 2, the web is continuously fed from a supply roll 36 through a pair of drive nip rollers 38 into the rotating knives 12, 14 which cut the web 32 into successive individual sheets 34. Another pair of drive nip rollers 40 transports the individual cut sheets downstream to be processed, for instance, by a stacking device. It is typical for the drive nip rollers 40 to operate at a higher speed than the drive nip rollers 38 located upstream of the knife 10. While FIG. 2 shows the web 32 being supplied by roll 36, it should be apparent to those skilled in the art that the continuous web 32 may be supplied to the drive nip rollers 38 by some other type of web manufacturing and/or processing equipment such as a slitter/scorer as is conventional in the art.

The cylinders 12, 14 are disposed generally transverse to the web 32, see FIG. 4. In FIG. 4, the web 32 is moving in the direction of arrow 42. As shown in FIG. 3, the knife blades 28, 30 engage in a scissors-like fashion to cut the web 32 transversely. The knife cylinders 12, 14 are skewed slightly as shown in FIG. 4 to compensate for the relationship of the helical cutting blades 28, 30 with respect to the continuous web 32, thus maintaining the straight transverse cut across the web 32.

When the helical blades 28, 30 engage each other in a scissors-like fashion to cut the web 32, it is important that the blades 28, 30 be moving at the same linear speed as the forward speed of the web 32 in the direction of arrow 42. In order to adjust the length of the individual sheets 34 cut in succession from the continuous web 32, the relative rotational speed of the knife cylinders 12, 14 with respect to the forward speed of the web 32 in the machine direction is varied for the period of the cycle when the blades 28, 30 are not engaged with the web 32.

Figure 5A:
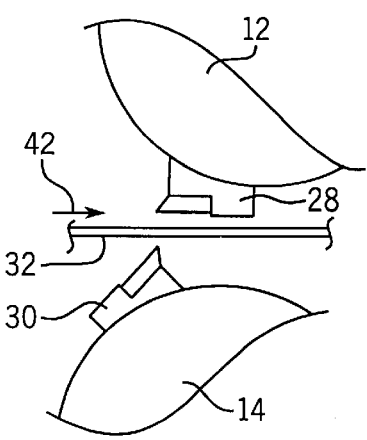
FIGS. 5a–5f are detailed schematic views showing the cutting process of the continuous web in the individual sheets by the rotary knife.
Figure 5D:
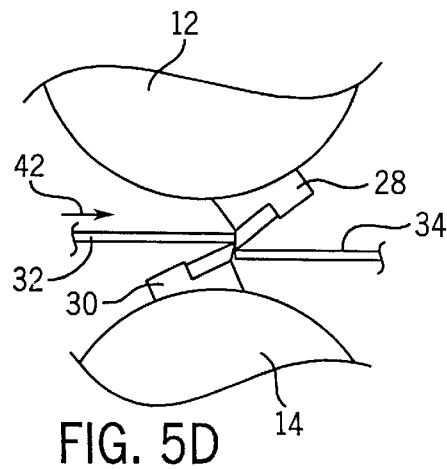
Figure 5B:
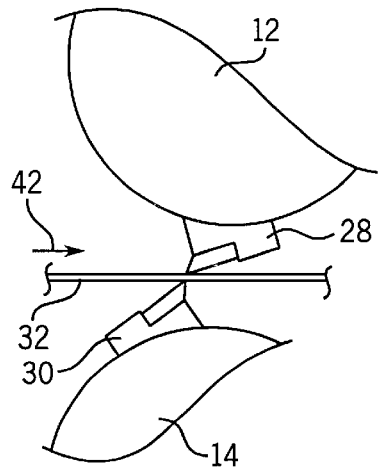
Figure 5E:
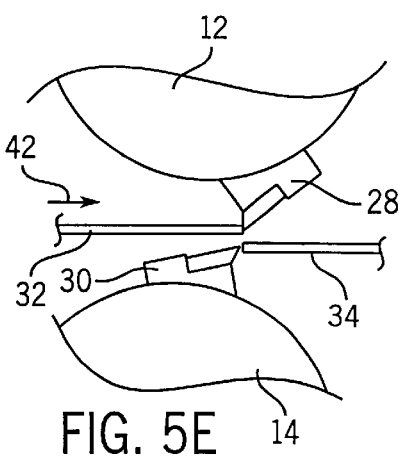
Figure 5C:
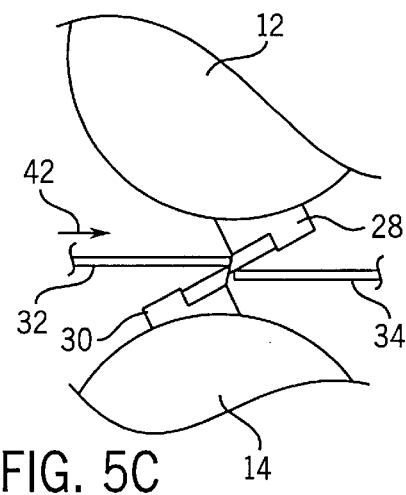
Figure 5F:
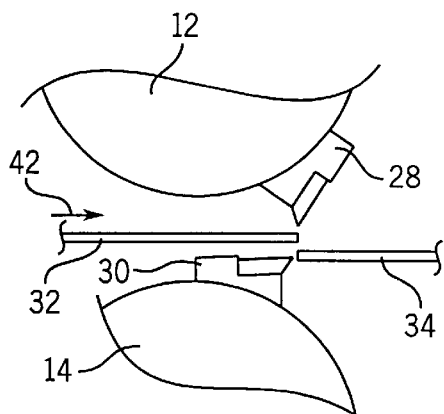

FIGS. 5a–5f show the cutting process by blades 28, 30 in the rotary knife 10 in detail. In FIGS. 5a–5f, the knife cylinders 12, 14 are shown at various stages of rotation from just prior to the engagement of the knives 28, 30 with the web 32, FIG. 5a, to just after engagement of the helical knives 28, 30 after the cut is made. FIG. 5a shows the helical blades 28, 30 just prior to the instant when the blades 28, 30 initially engage web 32. FIG. 5b shows the blades 28, 30 initially engaging the web 32. As explained above, substantial vertical impulse forces causing vibration in the vertical direction can occur when the cutting blades 28, 30 impact and cut the web 32. Vertical vibrations tend to dominate when the web is thicker or hard to cut, such as may be the case with relatively thick corrugated paperboard. FIGS. 5c and 5d show the helical blades 28, 30 cutting the web 32 to create the individual sheets 34. When making the scissors-like cut, it is important that the blades 28, 30 remain in tight engagement to create a clean cut as shown in FIGS. 5c and 5d. Due to this tight engagement, horizontal impulse forces often occur between the blades 28, 30 which can cause vibrations in the horizontal direction. In light duty applications, for example, thin or easy to cut webs, horizontal vibrations tend to dominate. FIGS. 5e and 5f show the helical blades 28, 30 just after the individual sheet 34 is cut from the web 32. Note that the individual sheet 34 is not displaced with respect to the continuous web 32 in the machine direction by the cutting of the web.

The extent of vertical and horizontal vibrations in the rotary knife 10 is dependent on several factors, including: the structural design of the rotary knife cylinders, the mounting of the knife cylinders to the knife frame 26, the rigidity of the frame 26, the properties of the continuous web being cut, and the speed and/or speeds of operation, etc. Testing on exemplary rotary knives 10 has shown that significant vibration problems occur characteristically at certain machine speeds or frequencies for a given structural design, mounting configuration, type of web being cut, etc. Thus, absent some sort of vibration control, rotary knives are likely to produce poor cuts at certain speeds of operation due to excessive vibration. In accordance with the invention, one or more active vibration damping systems 16, 18 are used to control vibrations of the knife cylinders 12, 14 to ensure precise, effective cutting of the web 32.

Figure 6:
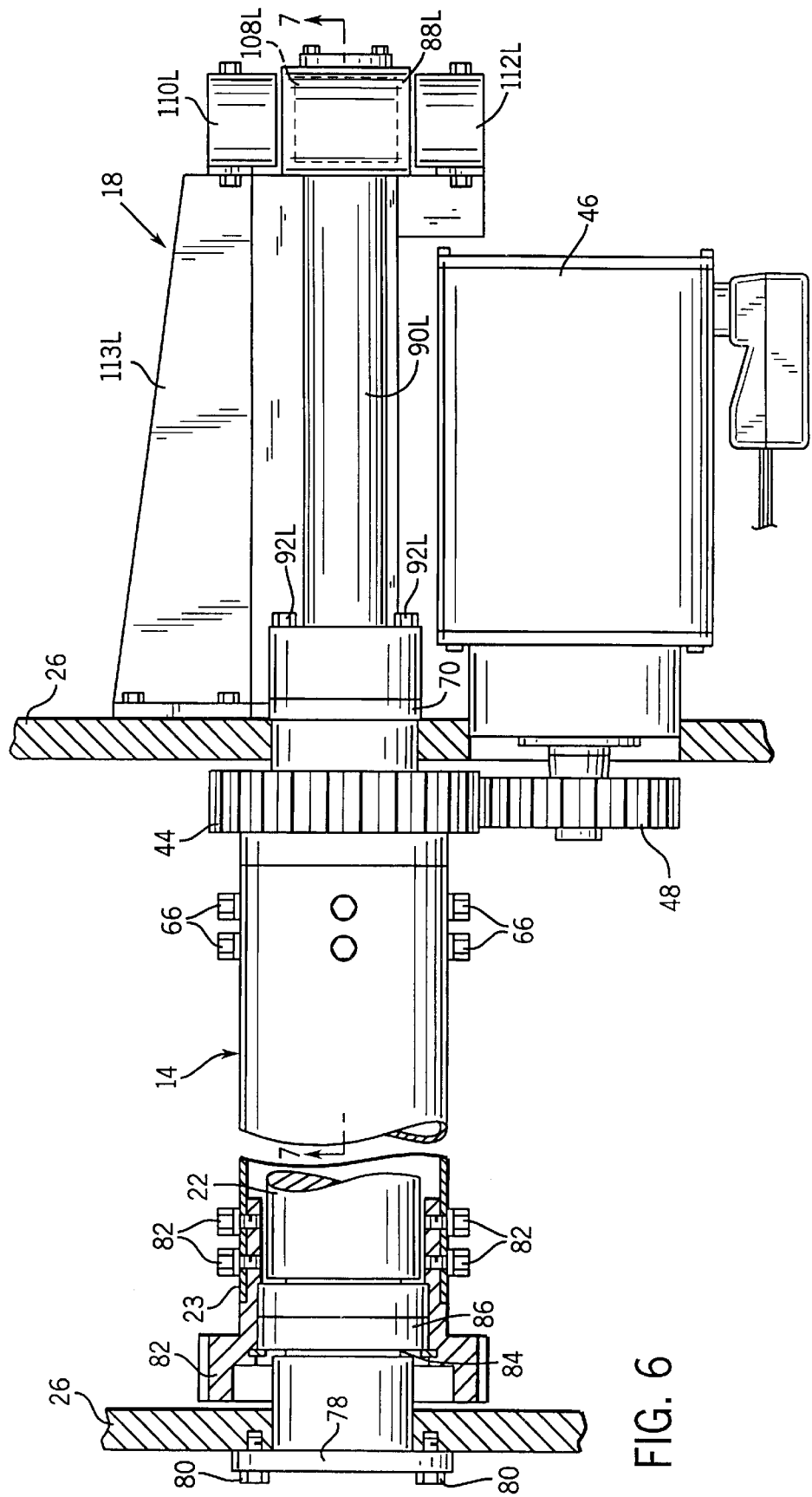
FIG. 6 is a detailed view of the active vibration damping system for the rotary knife taken along line 6—6 in FIG. 1.
Figure 7:
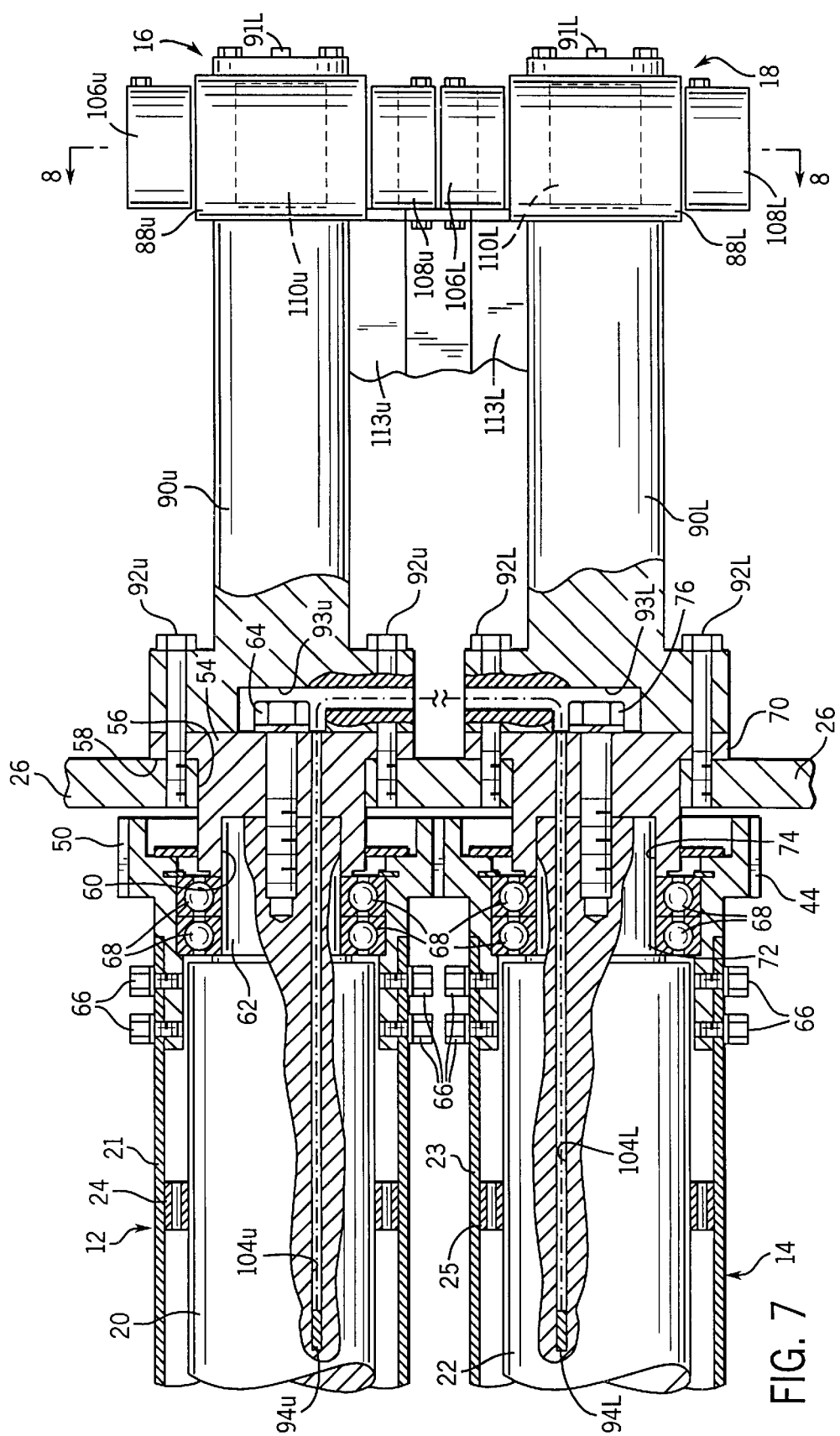
FIG. 7 is a detailed view of the active vibration damping system taken along line 7—7 in FIG. 6.

Referring to FIGS. 6 and 7, the stationary shaft 20 for the upper knife cylinder 12 is mounted to the frame 26 on each end of the shaft by a shaft retainer 54. The shaft retainer 54 is seated securely through an opening 56 in the knife frame 26. The retainer 54 includes a shoulder 58 that abuts the outside surface of the frame 26. The retainer 54 also includes a cylindrical recess 60 that opens to the inside of the frame 26. The end of the stationary shaft 20 includes a cylindrical stub 62 that seats in the cylindrical recess 60 on the retainer 54 to secure the stationary shaft 20 to the frame 26. A mounting bolt 64 secures the stationary support shaft 20 to the retainer 54. Drive gear 50 for the upper knife cylinder 12 is attached to the rotatable tube 21 for the upper knife cylinder 12 via a plurality of screws 66. The drive gear 50 is supported for rotation on the cylindrical stub 62 at the end of the stationary support shaft by bearings 68.

The mounting of the lower knife cylinder 14 to the knife frame 26 is preferably identical to the mounting of the upper knife cylinder 12 to the frame 26. Briefly, cylindrical recess 74 in retainer 70, FIG. 7, receives the cylindrical stub 72 on the end of the stationary shaft 22 for the lower knife cylinder 14. Mounting bolt 76 secures the retainer ring 70 and the stationary shaft 22 to the frame 26. Drive gear 44 is mounted to the rotatable tube 23 for the lower knife cylinder 14 via a plurality of screws 66. The drive gear 44 is rotatably supported on the cylindrical stub 72 at the end of the stationary shaft 22 by bearings 68.

Referring in particular to FIG. 6, the other end of the stationary support shaft 22 for the lower knife cylinder 14 is supported to the knife frame 26 by a retainer 78 that is secured to the frame 26 by bolts 80. A rotatable gear 83 is attached to the rotatable tube 23 via screws 82. The end of the stationary support shaft 22 has a cylindrical stub 84 that seats in a cylindrical recess in the welded retainer 78. The rotatable gear 83 is rotatably supported on the cylindrical stub 84 via bearings 86. Although not shown specifically in the drawings, the mounting of the upper knife 12 to this end of the knife frame 26 is preferably done in a similar or identical manner.

In the system shown in the drawings, the active vibration damping system 16 for the upper knife cylinder 12 is identical to the active vibration damping system for the lower knife cylinder 14. As previously explained, however, it may be desirable to modify the upper 16 or lower 18 active vibration damping system depending on the specific configuration for the rotary knife and the respective cylinders 12, 14, mounting arrangements, etc. The following description with respect to FIGS. 6–8 focuses primarily on the active vibration damping system 18 for the lower knife cylinder 14, although it should be understood that the active vibration damping system 16 for the upper knife system 12 is similar in many if not all respects.

The active vibration damping system 18 for the lower knife cylinder 14 includes a rigid lever arm 90L which is mounted to the retainer 70 for the lower cylinder 14 and the frame 26 via bolts 92L. The lever arm 90L includes a cavity 93L at the base of the lever arm 90L to provide clearance for the mounting bolt 76. The lever arm 90L is preferably made of steel. The lever arm 90L should be sufficiently rigid and its coupling to the stationary shaft 22 should be sufficiently rigid so that the stationary shaft 22 and the lever arm 90L effectively act as a mechanically unitary unit.

Figure 9:
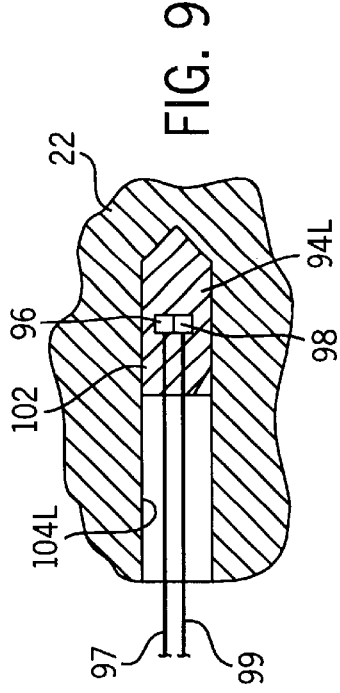
FIG. 9 is a detailed view illustrating the mounting technique for accelerometer vibration sensors used to implement the invention in its preferred embodiment.

A potted sensor element 94L is located within the stationary support shaft 22 for the lower cylinder 14. The potted sensor element 94L is shown in detail in FIG. 9. The potted sensor element 94L preferably includes two accelerometers 96, 98, each providing an electrical lead 97, 99 to an electronic controller such as a digital signal processor 100, FIGS. 10 and 11. The purpose of the accelerometers 96, 98 is to measure the vibration of the stationary shaft 22. Preferably, the accelerometers 96, 98 are mounted orthogonally to one another. Even more preferably, one of the accelerometers, for example accelerometer 96, measures acceleration in the vertical direction whereas the other accelerometer, for example accelerometer 98, measures acceleration in the horizontal direction. It is not necessary, however, that the accelerometers 96, 98 measure orthogonal vibrations. Rather, the invention can be implemented effectively to attenuate vibrations in two dimensions as long as the accelerometers 96, 98 measure vibrations in linearly independent directions and are rotated at least 45° from one another. Under these conditions, suitable monitoring performance can be achieved using appropriate algorithms in the digital signal processor 100. In implementing an active vibration damping system for attenuating vibrations in a single direction, it may be necessary to use only one accelerometer 96 or 98. As shown in FIG. 9, accelerometers 96, 98 are potted in a potting compound 102, such as an epoxy, to fix the relative positions of the accelerometers 96, 98. The sensor element 94L is affixed with adhesive within a bore 104L in the stationary support shaft for the lower cylinder 14. FIG. 7 schematically shows the bore 104L passing through the retainer ring 70 and into the stationary support shaft 22 off-center from the centerline of the stationary support shaft. In practice, it is desirable for the bore 104L to pass through the mounting bolt 76 and into the stationary support shaft 22 along the centerline of the stationary support shaft 22.

Since the purpose of the sensing element 94L is to monitor the vibrations of the lower knife cylinder 14, it is important that the sensor element 94L be located in a region within the stationary support shaft 22 that is effective for monitoring vibrations of the cylinder 14, and more specifically in a location that will sense the most significant vibrations over the normal operating range of the rotary knife 10. Preferably, the sensor element 94L is located approximately equidistant between the location at which the first end of the stationary support shaft 22, e.g. retainer 70, is affixed to the frame 26 and the location of which the other end of the stationary support shaft, e.g. retainer 78, is affixed to the frame 26. While this is the preferred location for the sensing element 94L, it has been found that the system works satisfactorily as long as the sensing element 94L is located at a location 20%–80% between the respective retainer 70, 78. If desired, additional or redundant sensor elements 94L can be used within the stationary support shaft 22.

The active vibration damping system 18 for the lower cylinder 14 also preferably includes two pairs of electromagnetic actuators 106L, 108L and 110L, 112L. Electromagnetic actuators 106L, 108L provide opposing pulling force on the freely suspended end 88L of the lever arm 90L in the vertical direction, whereas actuators 110L, 112L provide opposed pulling forces on the freely suspended end 88 of the lever arm 90L in the horizontal direction. The electromagnetic actuators 106L, 108L, 110L, 112L are mounted on an actuator mounting bracket 113L that is secured to the frame 26 of the rotary knife 10. In a one-dimensional system, it may not be necessary to include both pairs of electromagnetic actuators (i.e., the system can be implemented in one dimension on the lower knife with a single pair of actuators if desired).

As previously mentioned, the components for the active vibration damping system 16 for the upper cylinder 12 are similar and preferably identical to the components of the lower system 18. In FIG. 7, like components for the active vibration damping system for the upper cylinder 12 have been labeled with similar reference characters in which the letter U representing "upper" has been substituted for the letter L representing "lower".

Figure 8:
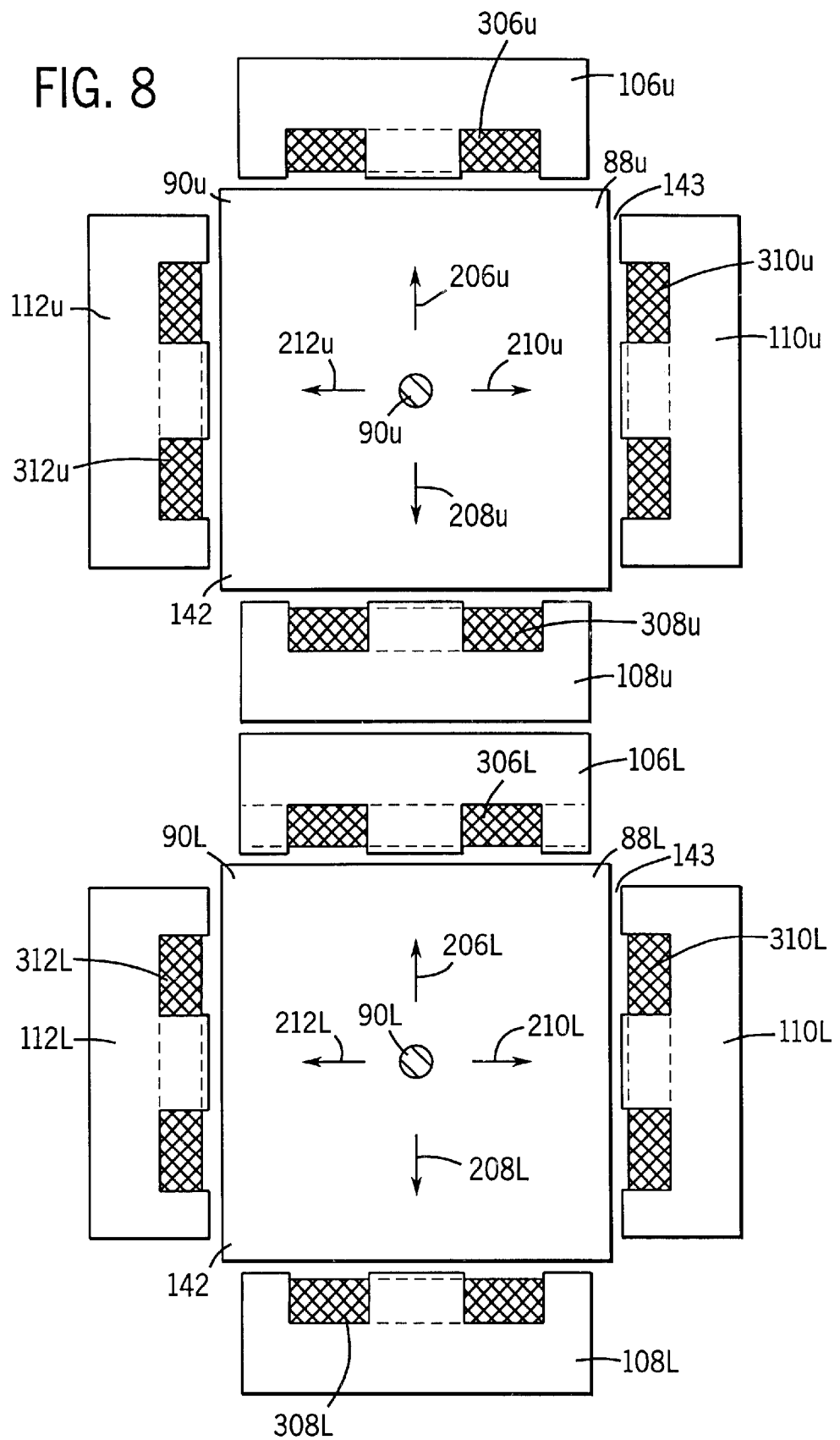
FIG. 8 is a detailed view of the active vibration damping system taken along line 8—8 in FIG. 7.

FIG. 8 is a view taken along line 8—8 in FIG. 7, and it shows the effect of the electromagnetic actuators on the freely suspended ends 88U, 88L on the upper lever arm 90U and the lower lever arm 90L, respectively. It is preferable that the freely suspended ends 88U, 88L of the lever arms 90U, 90L be fabricated from a plurality of thin ferromagnetic sheets 142 which are disposed vertically and laminated together. The thin metal sheets 142 should be aligned generally along the direction of the magnetic field generated by the electromagnetic actuators 106U, 108U, 110U, 112U and 106L, 108L, 110L, 112L. If the freely suspended ends 88U, 88L are not fabricated from a plurality of aligned, laminated metal plates 142, the changing magnetic fields will induce eddy currents which are likely to create significant heat. It is preferred to use a bolt 91U, 91L to secure the plates 142 onto the remaining portion of the lever arm 90U, 90L.

Preferably, the electromagnets 106U, 108U, 110U, 112U and 106L, 108L, 110L, 112L are E-type electromagnets each including a single coil 306U, 308U, 310U, 312U and 306L, 308L, 310L, 312L around the center arm for the respective electromagnet. Suitable electromagnet output can be accomplished by providing coils with approximately 80 turns at 50 amperes (i.e. 4,000 ampere-turns). No permanent magnets are provided in the thin metal sheets 142 of the freely suspended ends 88U, 88L of the lever arms 90U, 90L. As mentioned, the thin ferromagnetic sheets 142 are made of a ferromagnetic material such as steel. Therefore, the electromagnet actuators shown in FIG. 8 are capable of providing only pulling force, and are not capable of providing pushing force against the freely suspended ends 88U, 88L of the lever arms 90U, 90L. More specifically, when current is provided to coil 306U, electromagnet 106U pulls on the freely suspended end 88U of the lever arm 90U in the upward vertical direction depicted by arrow 206U. To provide a force in the downward vertical direction as depicted by arrow 208U, current is provided to coil 308U of electromagnet 108U. In order to provide a horizontal force on the freely suspended end 88U in the direction of arrow 210U, current is provided to coil 310U for electromagnet 110U. In order to provide a horizontal pulling force in the opposite direction as depicted by arrow 212U, current is provided to coil 312U for electromagnet 112U. The operation of the electromagnets 106L, 108L, 110L, 112L to provide opposed vertical pulling forces 206L, 208L and opposed horizontal pulling forces 210L, 212L is accomplished in the same manner by selectively providing current to coil 306L for electromagnet 106L, coil 308L for electromagnet 108L, coil 310L for electromagnet 110L, and coil 312L for electromagnet 112L. It should be pointed out that the preferred gap between the plates 142 and the electromagnets, depicted by arrows 143, is about 1/16 of an inch when the system is not in operation. Such a small gap is possible because the rigid lever arm is not displaced during system operation as much as the tuned-mass of the previous system. This is important because the reduced gap distance exponentially increases the amount of magnetic force from the electromagnets usable in the system.

While the above-described electromagnetic actuator system is a preferred method of implementation, the invention can be implemented using mechanical, pneumatic or hydraulic actuators which provide a vibration control force directly against the lever arm. In systems in which the lever arm rotates with the cylinder, a bearing collar can be used to transmit the force between the actuator and the rotating lever arm.

Figure 10:
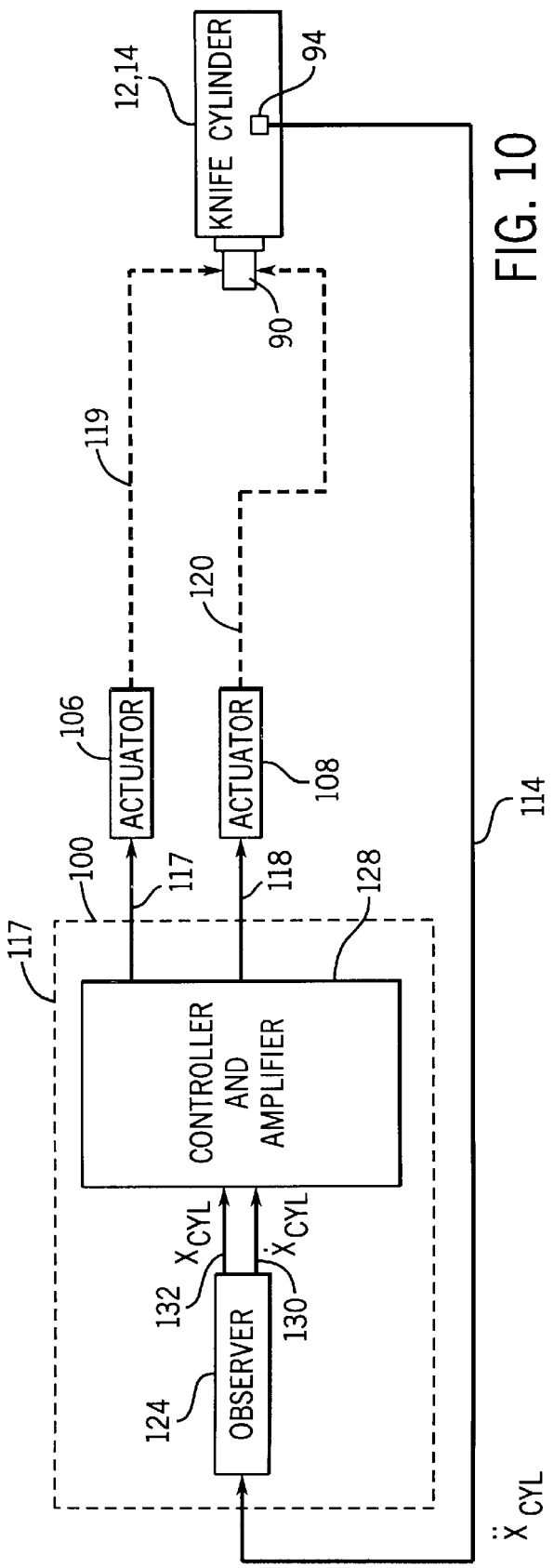
FIG. 10 is a schematic drawing illustrating the preferred control system for a one-dimensional active vibration damping system in accordance with the invention.

FIG. 10 schematically illustrates the operation of a one-dimensional active vibration damping system in accordance with the invention. As shown in FIG. 10, the electronic control unit 100 receives a signal from the vibration sensor 94 for the knife cylinder through line 114. For each sampling period, the electronic control unit 100 outputs a command signal to either actuator 106 through line 117, or actuator 108 through line 118. The actuator 106 provides a force (depicted as dashed arrow 119) on the lever arm 90 in response to the command signal (line 117) from the electronic control unit 100, and actuator 108 provides a force (depicted as dashed arrow 120) on the lever arm 90 in response to the command signal (line 118) from the electronic control unit 100. The forces applied by the actuators 106, 108 on the lever arm 90 are pulling forces, preferably in diametrically opposed directions such as the upward vertical and downward vertical directions. As depicted in FIG. 10, the lever arm 90 is mechanically coupled to the knife cylinder so that the lever arm and the knife cylinder 12, 14 operate as a single mechanical unit.

The electronic control unit 100 is preferably a digital signal processor operating at a sampling rate of approximately 4,000 Hz, although the optimum sampling rate may vary with respect to the specific application. The digital signal processor 100 includes the appropriate A/D and D/A converters to communicate with the analog accelerometer 94 and actuators 106, 108. The A/D and D/A converters may not be necessary if the accelerometer 94 or the actuators 106, 108 are capable of digital output/input. The electronic control unit 100 preferably implements a state space control system to generate the command signal in lines 117 and 118. The preferred state space control system includes a knife cylinder observer 124 and a controller 128. The knife cylinder observer 124 inputs a discrete signal (through the respective A/D converter) from the knife vibration sensor 94 during each sampling period k, and outputs state signals, lines 130 and 132, for the knife cylinder for the subsequent sampling period k+1. The controller 128 receives the state signals, lines 130 and 132, for each sampling period, and outputs a command signal in lines 117 and 188 (through an A/D converter) for each sampling period that is used to control the actuators 106, 108. As previously explained, the knife vibration sensor 94 is preferably an accelerometer. In this preferred system, the state signals outputting the knife cylinder observer 124 are signals representing position and velocity of the knife sensor 94. More specifically, the state signals outputting the knife cylinder observer 124 shown schematically as lines 130, 132 are a knife cylinder velocity signal for the subsequent sampling period (i.e. CylVel(k+1))

and a knife cylinder position signal for the subsequent sampling period (i.e. CylPos(k+1)). The preferred knife cylinder observer 124 is given by the following expressions:

$$\text{CylPos}(k+1) = K_{P1,cyl} * \text{CylPos}(k) + K_{P2,cyl} * \text{CylVel}(k) + K_{P3,cyl} * \text{CylAcc}(k)$$

$$\text{CylVel}(k+1) = K_{V1,cyl} * \text{CylPos}(k) + K_{V2,cyl} * \text{CylVel}(k) + K_{V3,cyl} * \text{CylAcc}(k)$$

where CylAcc(k) represents the value of the cylinder acceleration as measured by the knife vibration sensor 94 for sample period k, CylVel(k) represents the calculated cylinder velocity for sample period k, CylPos(k) represents the calculated cylinder position for sample period k, coefficients $K_{P1,cyl}$, $K_{P2,cyl}$, $K_{P3,cyl}$, $K_{V1,cyl}$, $K_{V2,cyl}$, $K_{V3,cyl}$ are preselected constant values, CylPos(k+1) represents the calculated cylinder position for the subsequent sampling period k+1, and CylVel(k+1) represents the calculated cylinder velocity for the subsequent sampling period k+1.

It is desirable to select the coefficients for the observer 124 so that the observer 124 provides a suitable convergence time for estimating accurate state signal output, yet provides slow enough adaptation to effectively filter random noise from the signals from the vibration sensor 94. In other words, the observer 124, in addition to calculating velocity and position from acceleration signals, is a band pass filter that passes signals near the first natural frequency (e.g. approximately 50 Hz) and rejects the higher order natural frequencies.

The preferred controller 128 receives the state signals from the observer 124 and outputs a command signal for each sampling period k in accordance with the following expression:

$$\text{Cmd}(k) = C_{P,cyl} \text{CylPos}(k) + C_{V,cyl} \text{CylVel}(k)$$

where Cmd(k) is the command signal output from the controller for sampling period k, CylPos(k) is the cylinder position for sample period k calculated by the knife cylinder observer 124, CylVel(k) is the velocity of the cylinder for sample period k as calculated by the knife cylinder observer 124, and coefficients $C_{P,cyl}$ and $C_{V,cyl}$ are preselected constants. Note that it is also desirable for the coefficients $C_{P,cyl}$ and $C_{V,cyl}$ to account for phase shifts occurring in the system. The preferred control scheme is disclosed in above incorporated copending patent application Ser. No. 09/046,267, now U.S. Pat. No. 5,983,169, entitled "Phase Shift Accommodation In Active Vibration Damping Systems", by James R. Michler, assigned to the assignee of the present application. Briefly, the coefficients $C_{P,cyl}$ and $C_{V,cyl}$ for the preferred controller 128 are selected primarily in accordance with the Ricatti equation to provide a linear combination that models the behavior of the rotary knife with the lever arm attached thereto, and are then adjusted to account for unmodeled phase shifts in the system.

While the specific value of the constants for the observer 124 and the controller 128 depend on the particular rotary knife, a prototype system developed by the assignee uses the following values for coefficients:

| Coefficients | Value |
|---|---|
| $K_{P1,cyl}$ | 0.9045 |
| $K_{P2,cyl}$ | 0.000230 |
| $K_{P3,cyl}$ | 8.33E−7 |
| $K_{V1,cyl}$ | −26.32 |
| $K_{V2,cyl}$ | 0.9943 |
| $K_{V3,cyl}$ | 11.7E−6 |
| $C_{P,cyl}$ | 15935 |
| $C_{V,cyl}$ | 26 |

Using the above coefficients, it is desirable to scale the command signal Cmd(k) by a factor of 10. After the signal is scaled, the square root is taken (i.e. signal=square root of signal). This compensates for the fact that the force exerted by an electromagnet is proportional to the square of the magnetic field. The magnetic field is linearly proportional (within normal operating ranges) to the current through the electromagnet coil. After the square root, the signal is checked for peak limits. The maximum signal value should not exceed the capability of the D/A converter, and the minimum value should not fall below zero. The above-mentioned scaling factor compensates for this, plus the scaling factors of the A/D and D/A converters, the amplifier gain (amps out per volt in), and the accelerometer scaling factor (volts per g). Then the signal is output through lines 117 and 118 to amplifiers which are connected to actuators 106, 108.

It may be desirable to implement the invention as described thus far on a single knife cylinder in a single dimension (e.g. to attenuate vertical vibrations), on a single knife cylinder in two dimensions (e.g. to attenuate both vertical and horizontal vibrations), or on both the upper and lower cylinders in one and/or two dimensions. All such implementations are contemplated within the scope of the invention.

Figure 11:
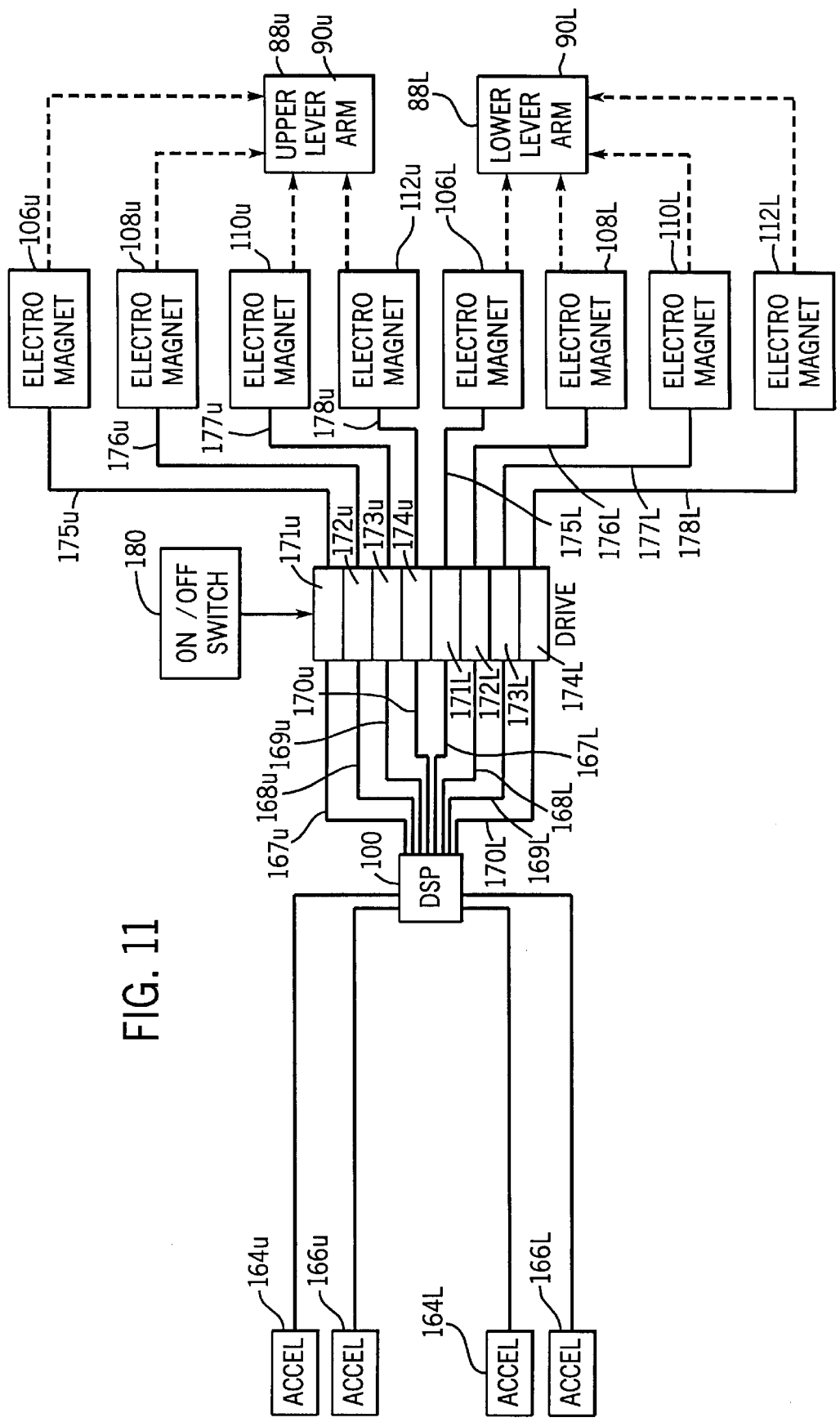
FIG. 11 is a schematic drawing illustrating a control system for implementing a two-dimensional active vibration damping system on both the upper and lower rotary knife cylinders.

FIG. 11 illustrates a system in which vibrations are attenuated in two dimensions on both the upper 12 and the lower 14 knife cylinders. Referring now to FIG. 11, the digital signal processor 100 receives analog signals from four accelerometers 164U, 166U for the upper cylinder 12 and 164L, 166L for the lower cylinder 14. By way of example, accelerometer 164U monitors horizontal vibrations in the upper stationary support shaft 20 and accelerometer 166U measures vertical vibrations in the upper stationary support shaft 20. Likewise, accelerometer 164L monitors horizontal vibrations in the lower stationary support shaft 22 and accelerometer 166 measures vertical vibrations in the lower stationary support shaft 22. For each pair of electromagnetic actuators (upper vertical pair 106U, 108U; upper horizontal pair 110U, 112U; lower vertical pair 106L, 108L; and lower horizontal pair 110L, 112L) the digital signal processor 100 includes an observer 124 and a controller 128 as depicted in FIG. 10. In other words, each pair of electromagnetic actuators has a dedicated control system which receives accelerometer input for the respective knife cylinder. In FIG. 11, the control algorithm (i.e. observer 124 in controller 128) outputs command signals in lines 167U, 168U, 169U, 170U and 167L, 168L, 169L, 170L. These command signals input dedicated drivers/amplifiers 171U, 172U, 173U, 174U and 171L, 172L, 173L, 174L, respectively. The electronic drivers/amplifiers provide the appropriate electrical current to the respective electromagnetic actuators 106U, 108U, 110U, 112U, and 106L, 108L, 110L, 112L via lines 175U, 176U, 177U, 178U and 175L, 176L, 177L, 178L, respectively. A common on/off switch 180 is preferably provided for all of the drivers/amplifiers 171U, 172U, 173U, 174U and 171L, 172L, 173L, 174L, thus enabling the entire system to be shut down contemporaneously. The drivers/amplifiers 171U, 172U, 173U, 174U, 171L, 172L, 173L, 174L output the appropriate amount of electrical current to the respective electromagnets to provide a pulling force in accordance with the command signals generated by the electronic controller 100.

It should be pointed out that the invention has been disclosed with respect to the preferred embodiments implementing the invention. It may be possible, however, to implement the invention in modified form. For example, the invention has application not only on low inertia rotary knives, but also on rotary knives using rotary cylinder axles with slight modifications. Such modifications, or various alternatives or equivalents, should be considered to fall within the scope of the following claims.

I claim:

1. A rotary knife for cutting a plurality of individual sheets in succession from a longitudinally traveling continuous web of material, the rotary knife comprising:

a frame;

a first rotatable knife cylinder and a second rotatable knife cylinder, each of the rotatable knife cylinders having a blade mounted on an outer cylindrical wall of the respective knife cylinder, the blades engaging each other as the knife cylinders rotate to cut the web; and an active vibration damping system for the first knife cylinder including:
  a lever arm having a first end coupled to the first rotatable knife cylinder and a second end that is freely suspended,
  a knife vibration sensor that monitors vibration of the first knife cylinder and generates a signal in response thereto,
  an electric control unit that inputs the signal from the knife vibration sensor and outputs one or more command signals, and
  an actuator that provides a vibration control force on the lever arm in response to the one or more command signals from the electronic control unit.

2. A rotary knife as recited in claim 1 wherein the actuator is an electromagnetic actuator and the lever arm includes a ferromagnetic portion in close proximity to the electromagnetic actuator.

3. A rotary knife as recited in claim 2 wherein:

the recited knife vibration sensor in the active vibration damping system for the first knife cylinder is a primary first knife vibration sensor that monitors vibrations of the first knife cylinder occurring in a primary direction which is perpendicular to a rotation axis of the first knife cylinder, the recited electromagnetic actuator is a first electromagnetic actuator that provides pulling force on the ferromagnetic portion of the lever arm in the same primary direction as monitored by the primary knife vibration sensor for the first knife cylinder, and the active vibration damping system for the first knife cylinder further comprises a second electromagnetic actuator which provides pulling force on the ferromagnetic portion of the lever arm in a direction opposing the pulling force provided by the first electromagnetic actuator for the first knife cylinder.

4. A rotary knife as recited in claim 3 wherein the active vibration damping system for the first knife cylinder further includes:

a secondary knife vibration sensor that monitors vibration of the first knife cylinder occurring in a secondary direction which is perpendicular to the rotation of axis of the first knife cylinder and is rotated from the primary direction at least 45°, and which generates a signal in response to vibrations occurring in the secondary direction, wherein the electronic unit receives a signal from the secondary first knife vibration sensor; and a third and fourth electromagnetic actuator that provide opposing pulling forces on the ferromagnetic portion of the lever arm in the secondary direction in response to one or more command signals from the electronic control unit.

5. A rotary knife as recited in claim 4 wherein the primary direction is generally vertical and the secondary direction is generally horizontal.

6. A rotary knife as recited in claim 1 wherein the actuator is an electromagnetic actuator and the freely suspended end of the lever arm comprises a plurality of thin metal sheets laminated together and aligned generally along a direction of a magnetic field generated by the electromagnetic actuator.

7. A rotary knife as recited in claim 1 wherein:

the first knife cylinder comprises a first tubular rotatable knife cylinder;

a first stationary support shaft located concentrically within the first tubular knife cylinder and fixed to the frame;

support bearings located between the first stationary support shaft and the first tubular knife cylinder to rotatably support the first tubular knife cylinder on the first stationary support shaft; and wherein the lever arm is coupled to the first rotatable knife cylinder by attaching the first end of the lever arm to an end of the first stationary support shaft.

8. A rotary knife as recited in claim 1 wherein the electronic control unit implements a state space control system to generate the one or more command signals.

9. A rotary knife as recited in claim 8 wherein the state space control system includes:

a knife cylinder observer that inputs a discrete signal from the knife vibration sensor during each sampling period and outputs state signals for the first knife cylinder for the subsequent sampling period; and a controller that inputs the state signals for each sampling period and outputs a respective command signal for each sampling period that is used to control the electromagnetic actuator.

10. A rotary knife as recited in claim 9 wherein:

the knife vibration sensor is an accelerometer; and the state signals output by the knife cylinder observer are a knife cylinder velocity signal for the subsequent sampling period and a knife cylinder position signal for the subsequent sampling period.

11. A rotary knife as recited in claim 8 wherein the state signals outputting the knife observer are a knife cylinder velocity signal for the subsequent sampling period and a knife cylinder position signal for the subsequent sampling period and wherein the knife cylinder observer is given by the following expressions:

$$CylPos(k+1) = K_{P1,cyl}*CylPos(k) + K_{P2,cyl}*CylVel(k) + K_{P3,cyl}*CylAcc(k)$$

$$CylVel(k+1) = K_{V1,cyl}*CylPos(k) + K_{V2,cyl}*CylVel(k) + K_{V3,cyl}*CylAcc(k)$$

where CylAcc(k) represents the value of a cylinder acceleration as measured by the knife vibration sensor for sample period k, CylVel(k) represents a calculated cylinder velocity for sample period k, CylPos(k) represents the calculated cylinder position for sample period k, coefficients $K_{P1,cyl}$, $K_{P2,cyl}$, $K_{P3,cyl}$, $K_{V1,cyl}$, $K_{V2,cyl}$, $K_{V3,cyl}$ are preselected constant values, CylPos(k+1) represents a calculated cylinder position for a subsequent sampling period k+1, and CylVel(k+1) represents a calculated cylinder velocity for a subsequent sampling period k+1.

12. A rotary knife as recited in claim 8 wherein the controller is given by the following expression:

$$Cmd(k) = C_{P,cyl} CylPos(k) + C_{V,cyl} CylVel(k)$$

where Cmd(k) is a command signal output for the controller for sampling period k, CylPos(k) is a cylinder position for a sample period k calculated by the knife cylinder observer, CylVel(k) is a velocity of the cylinder for a sample period k as calculated by the knife cylinder observer, and coefficients $C_{P,cyl}$ and $C_{V,cyl}$ are preselected constants.

13. A rotary knife as recited in claim 12 wherein the command signal Cmd(k) is scaled before being output to drive the electromagnetic actuator.

14. A rotary knife as recited in claim 1 further comprising an active vibration damping system for the second knife cylinder including:
 a lever arm having a first end coupled to the second knife cylinder and a second end that is suspended freely;
 a knife vibration sensor that monitors vibration of the second knife cylinder and generates a signal in response thereto which is input to the electronic control unit, and
 an actuator that provides a vibration control force on the lever arm for the active vibration damping system for the second knife cylinder in response to one or more command signals output by the electronic control unit.

15. A rotary knife as recited in claim 14 wherein the recited actuator for the second knife cylinder is a first electromagnetic actuator for the second knife cylinder, and the active vibration damping system for the second knife cylinder further includes a second electromagnetic actuator providing a vibration control force on the lever arm in a direction opposed to the direction of the vibration control force of the first electromagnetic actuator for the second knife cylinder.

16. A rotary knife as recited in claim 15 in which the active vibration damping system for the second knife cylinder further comprises a third and fourth electromagnetic actuator which provide opposed vibration control forces on the lever arm, and wherein the first and second electromagnetic actuators provide opposed vibration control forces on the lever arm along a primary direction, and the third and fourth electromagnetic actuators provide opposed vibration control forces on the lever arm along a secondary direction.

17. A rotary knife as recited in claim 16 wherein the primary direction is generally vertical and the secondary direction is generally horizontal.

18. A rotary knife as recited in claim 1 wherein the lever arm for the active vibration damping system preferably comprises a cylindrical steel rod having about a three inch diameter.

* * * * *